2 Sheets—Sheet 1.

G. CONKLING.

MAGNETIC SEPARATOR.

No. 11,012. Reissued July 16, 1889.

WITNESSES:
William Miller
Oscar A. Michel

INVENTOR:
Gurdon Conkling
BY
Van Santvoord & Hauff
his ATTORNEYS

G. CONKLING.

MAGNETIC SEPARATOR.

No. 11,012. Reissued July 16, 1889.

WITNESSES:

William Miller

Oscar A. Michel

INVENTOR:

Gurdon Conkling

BY

Van Santvoord & Huff his ATTORNEYS

UNITED STATES PATENT OFFICE.

GURDON CONKLING, OF GLENS FALLS, NEW YORK.

MAGNETIC SEPARATOR.

SPECIFICATION forming part of Reissued Letters Patent No. 11,012, dated July 16, 1889.

Original No. 383,863, dated June 5, 1888. Application for reissue filed June 3, 1889. Serial No. 313,020.

*To all whom it may concern:*

Be it known that I, GURDON CONKLING, a citizen of the United States, residing at Glens Falls, in the county of Warren and State of New York, have invented new and useful Improvements in Machines for Eliminating Iron from Ores and other Materials, of which the following is a specification.

This invention relates to a machine which is intended principally for concentrating magnetic iron ore in an economical manner, but which can also be used for separating iron filings from non-magnetic matter.

The peculiar and novel construction of my machine is set forth in the following specification and claims, and illustrated in the accompanying drawings, in which—

Figure 1:
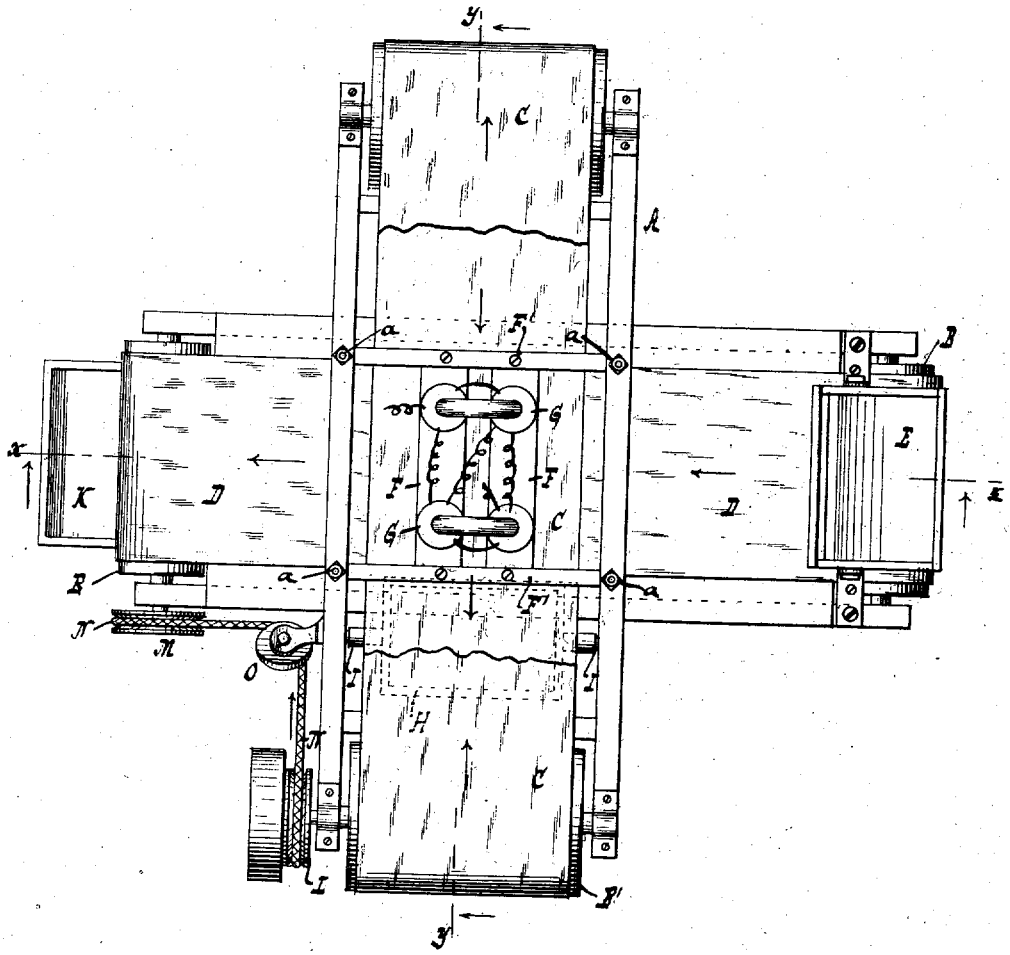
Figure 2:
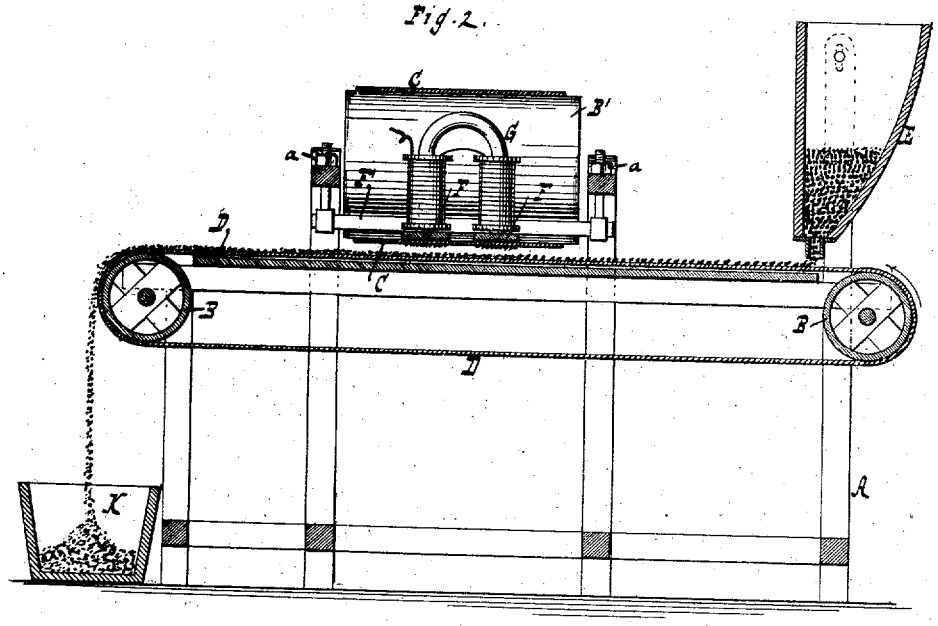
Figure 3:
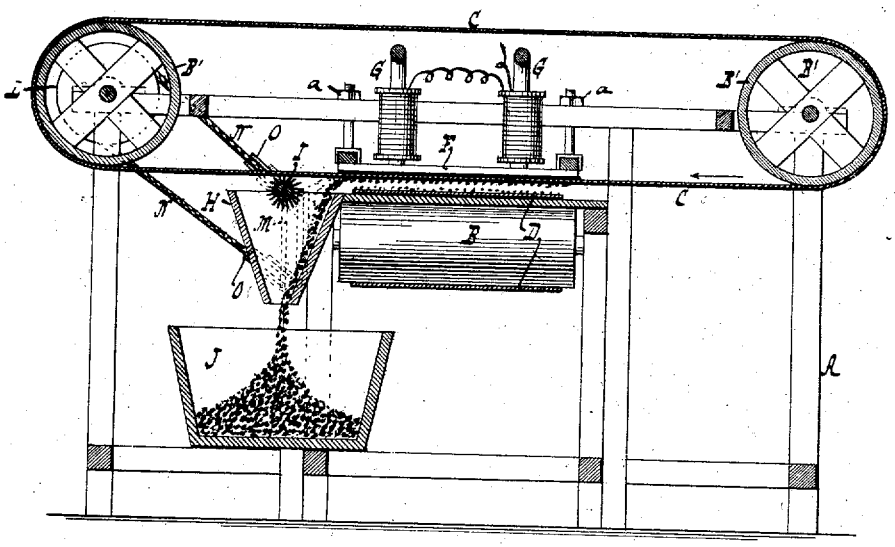

Figure 1 is a plan view, some portions being broken away to expose the parts below. Fig. 2 is a vertical section in the plane *x x*, Fig. 1, looking in the direction of the arrow opposite to that line. Fig. 3 is a similar section in the plane *y y*, Fig. 1, looking in the direction of the arrow opposite to that line.

Similar letters indicate corresponding parts.

In the drawings, the letter A designates a frame which forms the bearings for four rollers B B B′ B′. The rollers B B support the primary endless apron D, and the rollers B′ B′ support the secondary endless apron C, which runs transversely to the apron D. E is a hopper placed over the primary apron D. In proximity to the secondary apron C are placed one or more magnetized plates F. These plates are made, preferably, of hardened steel, and by placing upon them one or more magnets G they become magnetized. The magnets G may be permanent magnets or electro-magnets. The plates F are secured to traverses F′, which are connected by screws *a a* to the frame A, so that by means of said screws the plates F can be raised or lowered. A hopper H is placed in suitable relative position to the secondary apron C, (see Fig. 3,) and a brush or scraper I acts on said secondary apron. Suitable receptacles J K are provided—one for the concentrated ore or iron particles and the other for the gangue or refuse. A belt N, which extends round pulleys L M, is made to impart motion to the aprons C D. Said belt passes over guide-rollers O O, Figs. 1 and 3.

The machine operates as follows: The ore or the material to be treated is crushed or pulverized and fed to the primary apron D through the hopper E, so as to form a thin layer on said apron. As the apron is moved in the direction of the arrow thereon in Figs. 1 and 2, the layer of pulverized ore passes slowly beneath the magnetized plates F, and the iron contained in said layer being attracted by said plates is caused to adhere to the secondary apron C, which moves in the direction of the arrows shown thereon in Figs. 1 and 3. As this secondary apron moves along, the particles of iron adhering to it are carried over the hopper H, and they drop down through this hopper into the receptacle J, being separated from the apron either by their inherent gravity or by the action of the scraper I. The non-magnetic particles in the layer formed on the primary apron D are dropped into the receptacle K.

My machine can be used for concentrating iron ores of different kinds, and I have found it very useful in treating magnetic iron ore containing phosphorus or titanium.

It will be observed that the magnetic plate or plates F extend lengthwise in the direction of the motion of the apron with which the same co-operate. If said plates are placed transversely to the direction in which the apron moves, the machine is liable to become clogged.

What I claim as new, and desire to secure by Letters Patent, is—

1. The combination, with the primary apron, of a secondary apron to operate transversely to the primary apron, a magnetized plate secured in proximity to said secondary apron, so as to draw the iron particles to said secondary apron, and suitable driving mechanism for actuating the aprons, substantially as set forth.

2. The combination, with a primary apron and a secondary apron made to operate transversely to the primary apron, of a magnetized plate secured in proximity to said secondary apron, so as to draw the iron particles to said secondary apron, suitable driving mechanism for actuating the aprons, and a scraper or brush made to act on said secondary apron, substantially as set forth.

3. The combination, with a primary apron, of a secondary apron made to operate transversely to the primary apron, a magnetized plate secured in proximity to said secondary apron, so as to draw the iron particles to said secondary apron, and means for adjusting the magnetized plate in relation to the secondary apron, substantially as set forth.

4. The combination, with the feed-apron D and the transverse apron C, of a magnetic plate F, situated between the layers of the apron C in close proximity to one of the layers and extending lengthwise in the direction of the motion of said layer, substantially as shown and described.

5. The combination, with the apron C, of a magnetic plate F, situated between the layers of said apron in close proximity to one of its layers and extending lengthwise in the direction of the motion of said layer, substantially as shown and described.

In testimony whereof I have hereunto set my hand in the presence of two subscribing witnesses.

GURDON CONKLING.

Witnesses:
J. VAN SANTVOORD,
W. HAUFF.